United States Patent [19]

Jones et al.

[11] Patent Number: 4,989,641

[45] Date of Patent: Feb. 5, 1991

[54] ROTARY SELECTOR VALVE

[75] Inventors: Jeffrey A. Jones, Keene; John W. Herndon, Bakersfield, both of Calif.

[73] Assignee: Santa Fe Energy Co., Santa Fe Springs, Calif.

[21] Appl. No.: 420,026

[22] Filed: Oct. 11, 1989

[51] Int. Cl.$^5$ .................... F16K 13/02; F16K 31/524
[52] U.S. Cl. ................................. 137/625.11; 251/188; 251/161; 251/162; 251/249
[58] Field of Search .............. 137/597, 625.11, 625.46; 251/160, 161, 162, 163, 187, 188, 900, 249

[56] References Cited

U.S. PATENT DOCUMENTS

| | | | |
|---|---|---|---|
| 825,370 | 7/1906 | Zorbuch | 137/625.11 X |
| 2,282,455 | 5/1942 | Church et al. | 251/102 |
| 2,591,514 | 4/1952 | Courtot | 251/900 X |
| 2,690,894 | 10/1954 | Blevans | 251/249 X |
| 2,696,082 | 12/1954 | Fouron et al. | 251/249 X |
| 2,806,486 | 9/1957 | McDonald et al. | 251/249 X |
| 2,821,998 | 2/1958 | Mayhew | 251/188 X |
| 2,835,273 | 5/1958 | McDonald | 137/625.11 |
| 2,840,109 | 6/1958 | Wadleigh | 137/625.11 |
| 2,883,146 | 4/1959 | Knox | 251/159 |
| 2,996,083 | 8/1961 | Huska | 137/625.11 |
| 3,721,268 | 3/1973 | Erlich et al. | 137/625.46 |
| 4,124,036 | 11/1978 | Rogers | 137/375 |
| 4,296,913 | 10/1981 | Hoyer | 251/76 |
| 4,546,787 | 10/1985 | Meyers et al. | 137/625.11 X |
| 4,564,043 | 1/1986 | Trittler | 137/625.11 X |
| 4,683,906 | 8/1987 | Butler et al. | 137/375 |

FOREIGN PATENT DOCUMENTS 954849  9/1974  Canada .

OTHER PUBLICATIONS

LTV Energy Products Publication, 2 pages, 824-10C Rotary Selector Valve, date unknown.

Primary Examiner—John Rivell
Attorney, Agent, or Firm—Frederick E. Mueller

[57] ABSTRACT

A multi-port valve internally supports a rotatable trunnion having an elbow passage between a nozzle portion of the trunnion and a lower end outlet that communicates with a test port of the valve body. The outer end of the nozzle has an axially reciprocable hollow seal piston with a seal support ring whose outer face is formed with an endless groove to receive an O-ring. An actuating shaft is coaxially mounted in an upper end of the trunnion and has a lower end with an eccentric pin engaged in a slot of the seal piston to reciprocate the seal piston into and out of sealing registration around a port selected by rotation of the trunnion. External ends of the actuating shaft and trunnion are respectively drivably coupled to a coaxial sprocket wheel and geneva wheel. A housing on top of the valve contains an input rotor fitted with a cam and a drive roller for engaging radial slots of the geneva wheel alternately with cam engagement of the dwell notches of the geneva wheel. Concurrently and in advance of forward rotation of the geneva wheel, a rotor driven seal actuating yoke a a free end engages one of a series of radial slots of the sprocket to rotate the sprocket in a retrograde direction to disengage the seal. When the yoke is disengaged, a detent mechanism temporarily locks the geneva and sprocket wheels together for co-rotation in a forward direction as the geneva drive roller again comes into engagement with the geneva wheel. After the nozzle has been advanced one step, further rotation of the input rotor advances an arm independently pivotally mounted on the yoke to compress a spring mechanism to bias the yoke and sprocket to compress the seal on a seat around the next port.

31 Claims, 4 Drawing Sheets

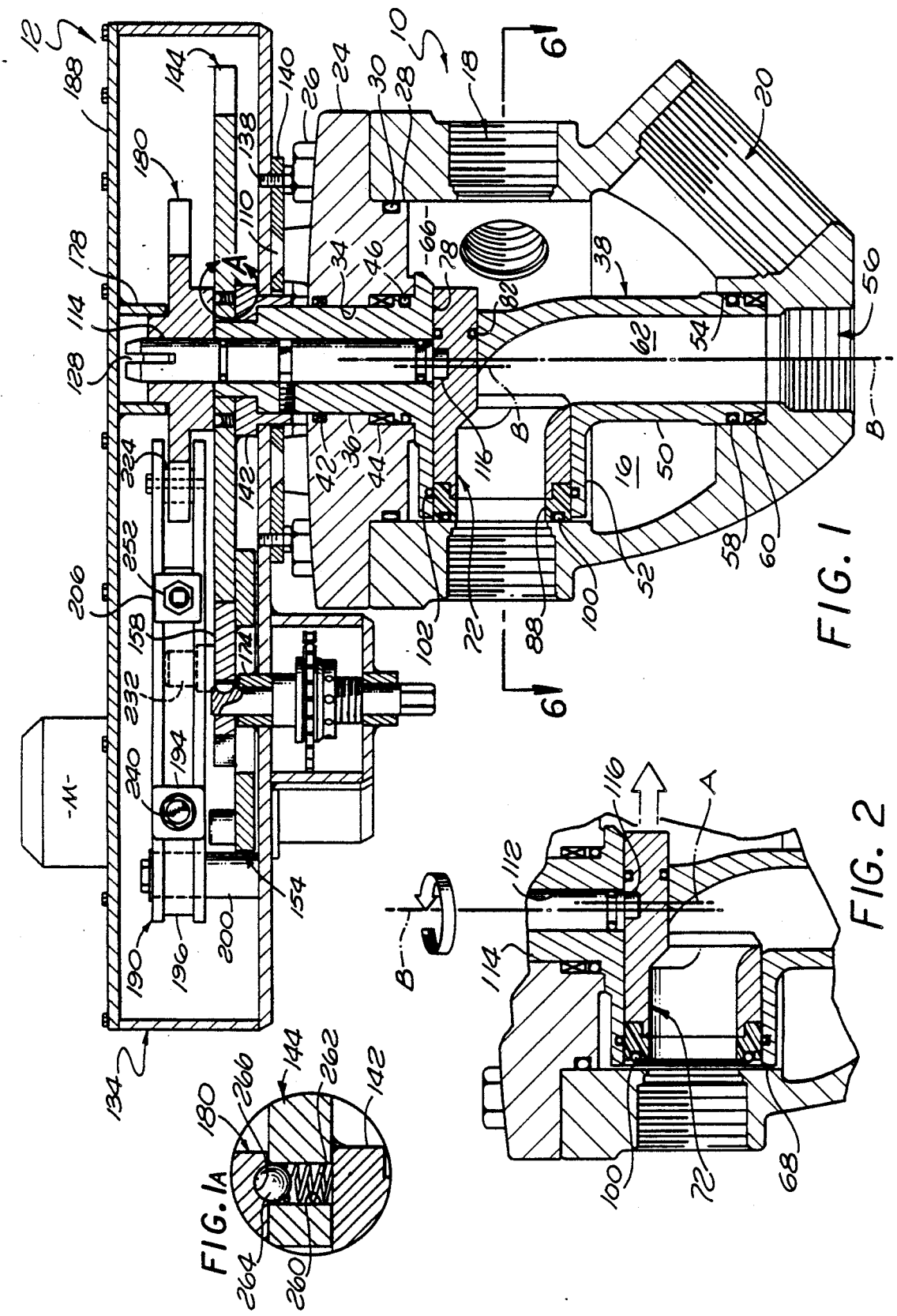

ROTARY SELECTOR VALVE

BACKGROUND OF THE INVENTION

The present invention relates to valves and, more particularly, to a multi-position rotary selector valve.

Multi-port selector valves have been in use for many years in a variety of applications. Generally, as employed in oil fields where it is desired to isolate one of a plurality of incoming fluid streams for testing the volume and composition of the isolated stream, such valves comprise a valve body having circularly spaced apart inlet ports each of which receives fluid from a well head. The valve body cover plate rotatably mounts one end of a trunnion whose lower end is rotatably mounted in a bottom portion of the valve body. The trunnion member contains an elbow passage having an inlet nozzle that can be turned into registration with a selected one of the inlet ports for conducting the selected well stream to a test outlet in the lower end of the valve body in communication with the opposite end of the elbow passage. The non-isolated fluid streams entering through the other inlet ports commingle in a common cavity of the valve body to be exhausted through a production outlet, also formed in the lower portion of valve body.

In the prior art rotary valve, the inlet nozzle to the elbow passage comprises a hard plastic sliding seal ring mounted on a shoulder of a steel seal backup ring which, in turn, is seated upon a wavy steel seal-energizing spring ring backed up by an adjusting nut threadedly engaged within the nozzle mouth. The seal ring free-floats inside the nozzle mouth and is pressed tightly against a machined cylindrical surface of the valve body by the spring ring. As the nozzle is rotated from one port to another, the hard seal slides against the valve body wall. If a grain of sand or other particle happens to lodge in this tight fit, the plastic seal is scratched and begins to leak. Internal valve corrosion also erodes the plastic seal. In order to restore the seal, the backup nut must then be adjusted to compress the backup spring to further load the seal which, in turn, effects further erosion. In addition, as the seal ring is tightly slidably engaged with the valve body wall while turning from one position to another, the seal may itself rotate relative to its supporting ring and assume a position of its convex sealing surface which is not matingly complementary to the configuration of the machined cylindrical inner surface of the valve body on which it is intended to seat.

In addition, a higher pressure normally is obtained inside the nozzle than within the valve body cavity such that the hard plastic seal ring tends to be unseated by the differential pressure. In an effort to remedy the ensuing leakage, the only solution is to further compress the backup spring which, in turn, exacerbates seal erosion.

The prior art valve has been so prone to internal leakage that it has been customary to dedicate one of its inlet ports solely to sue as a test position in order to detect leakage and to gain access to the adjusting nut to further compress the backup spring. Such dedication of one of the inlet ports for use solely as a test position eliminates use of that port as a test site for another well and so increases equipment costs.

Other disadvantages of the prior art valve are due to the mechanism for moving and positioning the nozzle. As the nozzle seal is tightly pressed against the valve body in sliding from one port to another, a substantial amount of torque must be applied from a large motor. Also, a circular metal cam is attached to the nozzle rotating shaft to actuate one of a series of manually adjusted motor shut-off microswitches when the nozzle mouth is over the appropriate port. In field usage it has been found that this switch mechanism is not sufficiently positive in indexing the nozzle with respect to a selected port due to slipping micro switches, the use of multi-conductor cable which is prone to electrical failure, and normal deterioration of the mechanical couplings from the drive gear box to the electronic and valve mechanisms.

SUMMARY OF THE INVENTION

The foregoing and other disadvantages of prior art selector valves are overcome by the present invention.

The invention provides an improved multi-port selector valve which minimizes internal leakage and has a rotary nozzle member which can be positively indexed to a new test position and be rotated between inlet test ports by a small motor since there is no sliding friction between the nozzle inlet and the valve body. The invention also provides an internal valve mechanism or trunnion assembly which can be retrofitted to existing valve bodies without reworking of the bodies and their covers.

A valve body is formed with an internal cylindrical machined surface having a plurality of equally usable circularly spaced apart inlet ports. An upper end of the valve body is conventionally closed by a cover plate that rotatably mounts an upper end portion of a inlet port selector means comprising a trunnion member having a lower end gudgeon rotatably seated within the lower end of the valve body. The trunnion member includes a side arm portion comprising the inlet nozzle to an elbow passage through the trunnion member, the lower end of the elbow passage communicating with a test outlet port formed in the valve body. The remaining inlet ports induct fluids into the common valve cavity within the valve body to communicate with an outlet port also formed in the lower end of the valve body.

The side arm inlet nozzle of the trunnion member contains a hollow seal support means comprising a reciprocably mounted seal piston integrally formed at its inner end with an eccentric mounting shaft. An outer end of the seal piston seats a seal mounting ring, preferably made of hard plastic material, having an endless groove of dovetail cross-sectional configuration formed in its outer face. The dovetail groove replaceably mounts an endless or circular seal ring that, in a relaxed state, protrudes beyond the outer end face of the mounting ring.

The upper end portion of the trunnion member mounts actuating means to reciprocate the seal piston comprising a coaxial actuating shaft. The lower end of the shaft has an integrally formed eccentric pin to engage the sides of a transverse slot formed in the support shaft for the seal piston. Rotation of the actuating shaft effects limited reciprocation of the seal piston between extended and retracted positions thereof. In the extended position of the seal piston, the seal ring is compressed into tight sealing engagement with the cylindrical inner surface of the valve body around a selected inlet port. In the retracted position of the seal piston, the seal ring is retracted from contact with the valve body in order to be turntable to the next inlet port without sliding contact with the valve body.

Sequencing and control means to effect phased reciprocation of the seal piston and rotation of the inlet nozzle are mounted in operative association with upper end portions of the trunnion member and the actuating shaft for the seal piston. The mechanism includes a drive shaft coaxially keyed to an input rotor. The input rotor comprises a sequencing cam on its upper face in operative association with a geneva wheel portion of the control means that is formed with a plurality of dwell notches spaced alternately with a plurality of radially disposed geneva wheel drive slots. The number of dwell notches and drive slots are equal to the number of inlet ports formed in the valve body. The cam of the input rotor is normally engaged with one of the dwell notches in the geneva wheel such that, upon rotation of the input rotor and cam through a predetermined arc the geneva wheel, which is drivingly coupled to the upper end of the trunnion member, maintains the nozzle of the trunnion in an indexed position in registration with one of the inlet ports. As the cam rotates out of engagement with a dwell notch of the geneva wheel, a geneva drive roller carried by the input rotor enters into driving engagement with a slot of the geneva wheel to rotate the nozzle forwardly through a predetermined arc into alignment with the next adjacent inlet port.

In order to retract the seal piston and its seal ring, prior to rotation of the trunnion member, the upper end portion of the actuating shaft coaxially mounts a sprocket wheel portion of the sequencing means that is drivingly coupled to the actuating shaft. The housing for the mechanism internally mounts a pivotal yoke in coplanar operative association with the sprocket. The free swingable end of a pair of lever arms of the yoke assembly mount a roller that is driving engageable with a selected one of a plurality of radially disposed asymmetrical slots formed in the sprocket. Mounted between the opposed arms of the yoke is an elongate bar formed with a longitudinally extending slot, the bar being pivotal independently of the yoke. The yoke mounts a bridging plate which loosely contains a spring loaded fastener carried by the intermediate bar and that normally biases the bar towards the yoke. An outer end of the yoke mounts an adjustable stop whose inner end is engageable by an outer end of the bar such that, when the bar is pivoted in a retrograde direction toward the yoke, the yoke is unidirectionally driveably engaged thereby. In order to effect sequential reciprocation of the bar, the upper face of the cam of the input rotor mounts a crank pin roller that traverses the slot of the tar to effect phased oscillation of the bar and yoke during rotation of the input rotor.

BRIEF DESCRIPTION OF THE DRAWINGS

FIG. 1 is a vertical, partly sectional view taken through the vertical axis of the rotary selector valve of the invention;

FIG. 1A is a partial sectional view of the area A of FIG. 1, on a larger scale, but showing different relative positions of certain parts;

FIG. 2 is a partial sectional view like FIG. 1 but showing the seal piston of the nozzle of the selector valve in a retracted position;

DESCRIPTION OF THE PREFERRED EMBODIMENT

Figure 3:
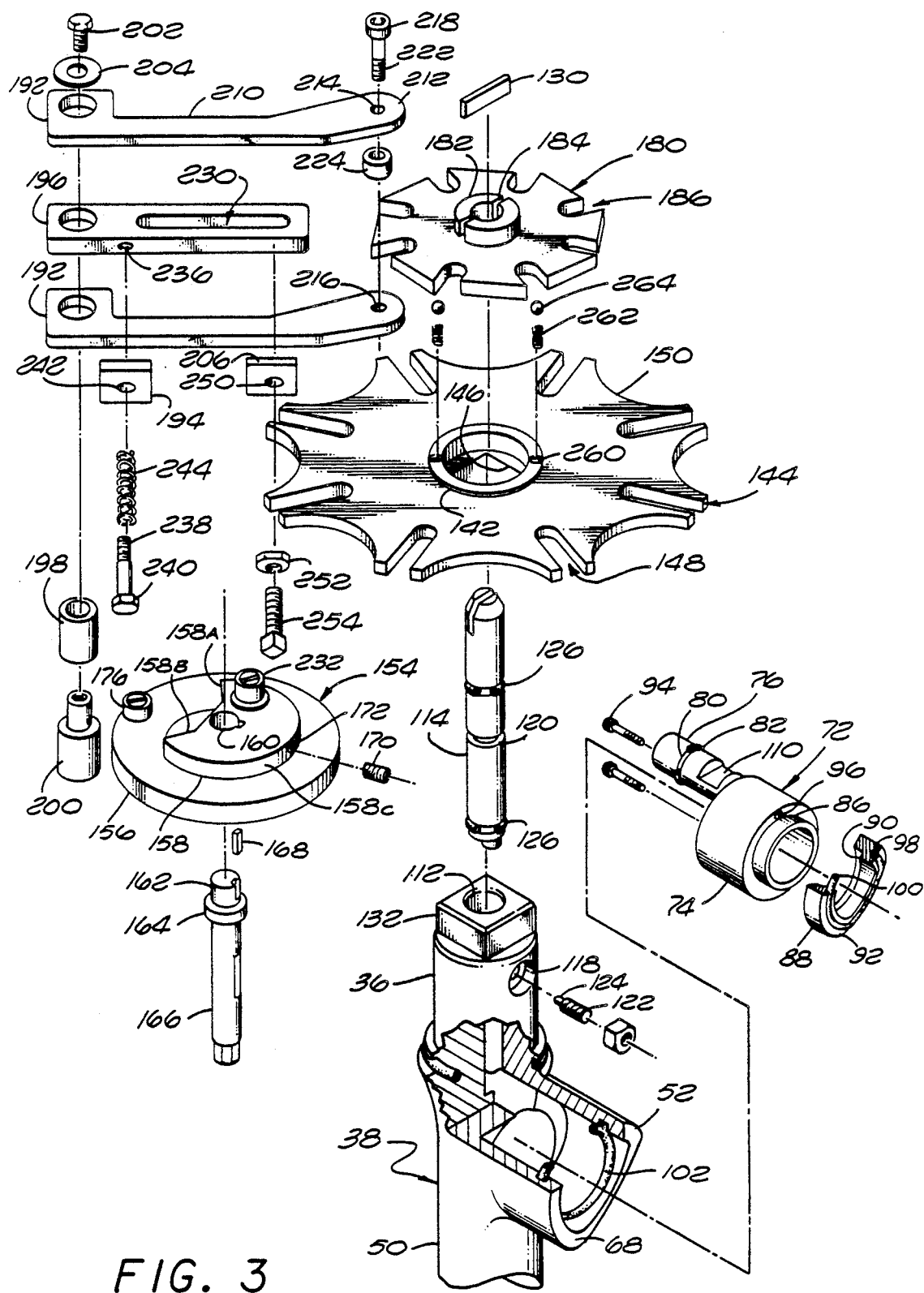
FIG. 3 is an exploded perspective view of internal components of the valve and its controller means.

Before explaining the invention in detail, it is to be understood that the invention is not limited in its application to the details of construction and the arrangement of components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

Referring to FIG. 1, the rotary selector valve of this invention comprises a valve assembly, designated generally by the numeral 10, on top of which a controller mechanism, designated generally by the numeral 12, is mounted. The valve assembly 10 comprises a hollow body 14 defining a common valve cavity 16. The side wall of the body 14 is formed with a plurality of radially extending inlet ports 18, all of which have their axes in a common plane. In the illustrated embodiment of the valve, the body 14 is formed with eight of the inlet ports 18. However, as is apparent, the valve body 14 could be formed with any desired practical number of inlet ports. In any event, each of the inlet ports 18 inducts a fluid from a different source into the common cavity 16 from whence the fluids, except for fluid from the particular source which it is desired to monitor, are exhausted from the valve body through a downwardly and sidewardly directed outlet port 20.

The upper end of valve body 14 is conventionally closed by a cover plate 24 that is held in position by a circular array of conventional threaded fastener means 26. The bottom face of the cover plate 24 may be formed with a circular boss 28 that is matingly received within the upper end of the valve body 14, the periphery of the boss 28 being formed with a circumferential groove for the reception of an 0-ring seal 30. At its center, the cover plate 24 is formed with a central circular opening 34 to rotatably seat an upper end stem portion 36 of a trunnion member, designated generally by the numeral 38. The stem portion 36 of the trunnion member extends upwardly beyond the cover plate 24 for operative association with the controller means 12, as will later appear. The hole 34 in cover plate 24 is formed with a spaced pair of recessed grooves for seating a felt seal ring 42 and a bushing 44 and, at its inner end, defines a shoulder for the reception of an 0-ring seal 46.

The trunnion member 38 is an essentially T-shaped member having a lower end gudgeon portion 50, coaxially aligned with the upper end stem portion 36, and a side arm nozzle portion 52 extending at a right angle. The nozzle axis is co-planar with the axes of ports 18. The lower end portion 50 of the trunnion member is rotatably seated within a central circular cavity 54 of valve body 14 in coaxial alignment with a test outlet port 56 through the bottom of the valve body. The lower end portion 50 of the trunnion member is formed on its external surface with a recessed groove for the reception of an 0-ring seal 58 and with a lowermost shoulder to seat a bushing 60. The trunnion 38 is thus seated within the valve body 14 and cover 24 such that the sidearm 52 can be rotated into registration with a desired one of the inlet ports 18. As is shown in FIG. 1, the side arm portion 52 and lower end portion 50 of the trunnion member are hollow to define an elbow shaped passage 62 such that fluid inducted from one of the remote sources thereof through a selected inlet port 18 is exhausted from the valve body through the test port 56.

Figure 6:
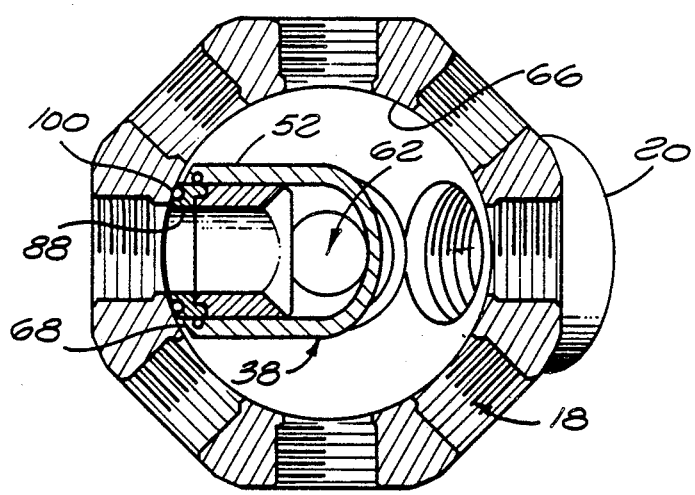
FIG. 6 is a transverse sectional view taken on the line 6—6 of FIG. 1.
Figure 7:
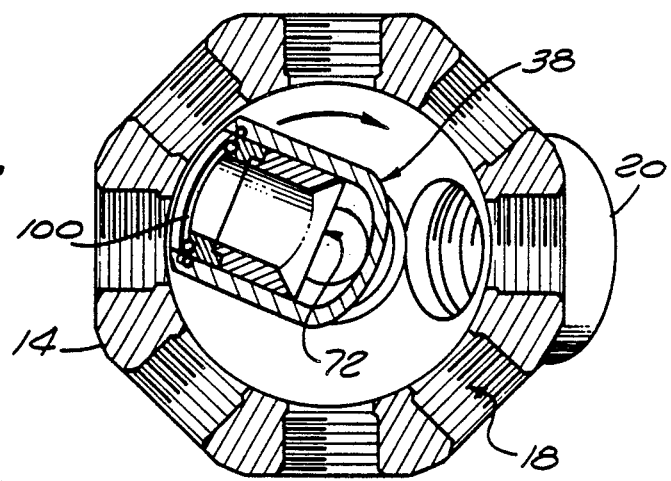
FIG. 7 is a view like FIG. 6 but showing the nozzle in a retracted position and angularly displaced from its position in FIG. 6.
Figure 8:
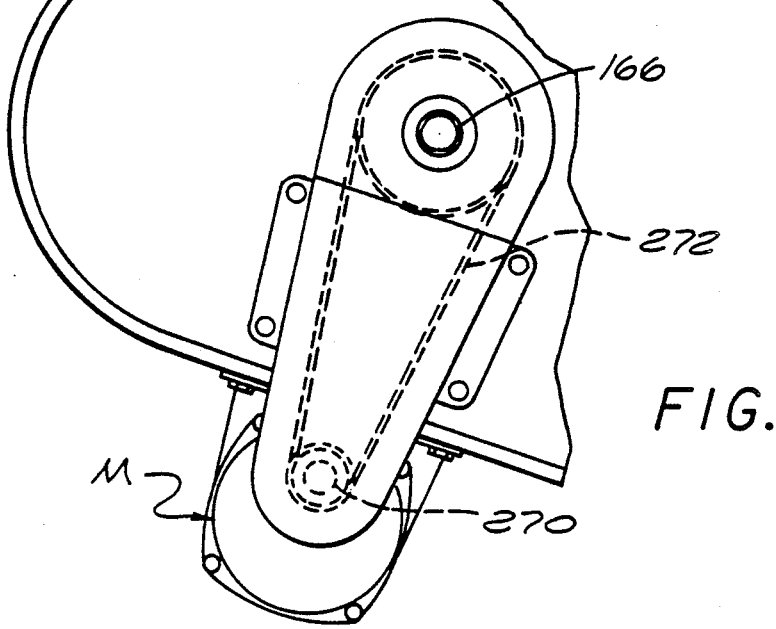
FIG. 8 is a partial bottom plan view of the control housing and motor housing.

In a region of the interior surface of the valve body 14 encompassing the seal seats around the inner ends of the inlet ports 18, the inner surface of body 14 is formed in the configuration of a smooth cylindrical surface 66. Accordingly, an outer end 68 of the side arm 52 of the rotary nozzle is formed with a complementary convex surface conforming to the locus defined by the intersection of a small cylinder with a larger cylinder at right angles thereto. As as shown in FIG. 6 and 7, there is preferably a slight clearance between the outer end 68 of the side arm 52 and the cylindrical surface 66 within the valve body, although a sliding clearance could be employed.

Telescopically slidably mounted within the side arm 52 is a seal piston, designated generally by the numeral 72, whose overall configuration is best seen in FIG. 3. The seal piston has a cylindrical body section 74 and its inner end is integrally formed with an offset shaft 76 of small diameter as compared to the diameter of the body section 74. The shaft 76 has a surface which has a point of tangency with the body section 74 such that a longitudinal trace of the external surface of body section 74 also constitutes a longitudinal trace of the shaft 76. As is shown in FIG. 1, a pocket or hole 78 is formed in a wall portion of the trunnion member 38 to matingly seat the shaft 76 for axial slidable reciprocation therein. Adjacent to the rear end of the shaft 76 is a recessed groove 80 for the reception of an 0-ring 82 in order to provide a fluid seal between the common cavity 16 of the valve body and elbow passage 62.

The outer end of the seal piston 72 is machined to define a shoulder 86 on which a complementary seat 90 of a ring 88 is seated. The ring 88 is preferably made of an essentially hard synthetic plastic material such as nylon and is formed with an outer end face 92 with a convex nonplanar configuration matingly complementary to the cylindrical surface portion 66 of the valve body. A pair of fasteners 94 extend through diametrically opposed holes 96 extending axially through the body portion 74 of the seal piston to be threadedly engaged with tapped bores (not shown) in the rear face of the ring 88 to hold the ring in place on the seal piston as it undergoes reciprocation within the side arm 52 of the rotary nozzle. An endless dovetail in cross section groove 98 is machined into the outer end face 92 of the ring 88 for the reception of a rubber 0-ring seal 100.

A recessed groove is formed on the inside surface of the outer end of side arm 52 of the trunnion to seat a seal ring 102. The seal piston 72 and the ring 88 secured thereto are reciprocable between a retracted position, shown in FIG. 2, and an extended position, shown in FIG. 1. As is best seen in FIG. 2, the dovetail groove 98 has a depth less than the diameter of the seal ring 100 so that, in the retracted condition of the seal piston 72, 0-ring 100 protrudes outwardly beyond face 92 of the ring 88, e.g., on the order of .050 inches. When the seal piston 72 is advanced into the extended position shown in FIG. 1, the 0-ring 100 is radially compressed against a seat portion of the cylindrical surface 66 of the valve body around each inlet port as the outer end face 92 of the ring 88 comes into faying contact with the surface 66. The footprint of the compressed seal may have a width, e.g., from one-eighth to three-eighths of an inch wide. Fluid at higher pressure entering the corresponding inlet port 18 is thus isolated from the fluids inducted through the remaining inlet ports 18 into the common valve cavity 16 and exhausts from test port 56 without any admixture with those other fluids. The radial area of the substantially cylindrical inner end face of the body 72 of the seal piston is substantially larger than that of the outer end face of the ring 88 within the seal 100 so that the piston effect generated by the high pressure fluid within the nozzle acts to seat the seal 100.

In order to reciprocate the seal piston 72 between extended and retracted positions, a flat bottomed slot 110 is machined across the top of the shaft 76 of the seal piston. A coaxial bore 112 through the upper end of the trunnion 38 registers at its lower end with the slot 110 and receives an actuating shaft 114 whose lower end is integrally formed with a flat bottom eccentric pin 116 which bears against the floor of the slot 110. To retain the actuating shaft 114 in place against vertical movement, the side wall of stem portion 36 has a through bore 118 to register with a circumferential groove 120 in the actuator shaft 114. The bore 118 threadedly receives a set screw 122 having an unthreaded inner end pin 124 receivable in the groove 120 to allow rotation of the actuator shaft 114. At opposite end portions the actuator shaft 114 has a pair of recessed grooves for the reception of 0-ring seals 126 to prevent escape of fluid around the actuator shaft.

The upper end of the actuator shaft 114 is formed with a diametrial slot 128 to receive a manual test key 130. The eccentric pin 116 of actuator shaft 114 has an axis A that is offset from the common axis B of the actuator shaft 114 and trunnion 38. Accordingly, as the actuator shaft 114 is rotated the seal piston 72 is reciprocated between the two different positions shown in FIGS. 1 and 2 by vertical sides of the pin 116 against opposite sides of slot 110. At the same time, it should be observed that by virtue of the eccentric shaft 76, the seal piston 72 is restrained against rotation about its axis so that the hard ring 88 and soft 0-ring seal 100 will maintain their original angular orientation relative to the cylindrical wall portion 66 in the valve body 14.

The controller means 12 automatically effects movement of the seal piston 72 to the retracted position of FIG. 2, rotation of the trunnion member 38 to an adjacent inlet port 18, and extension of the seal piston 72 to the closed position of FIG. 1. The controller means 12 are contained in a housing 134 adapted to be mounted on top of the valve 10 for operative association with the upper ends of trunnion 38 and actuating shaft 114 protruding through the valve cover plate 24.

More particularly, housing 134 has a bottom wall 136 that in one end portion is affixed, with fasteners 138, to an adapter plate 140 secured to the top of the valve cover 24 by fasteners 110. The bottom wall 136 is formed with an opening to rotatably journal a hub 142 of a geneva wheel 144. As best seen in FIG. 3, hub 142 is formed with a non-circular opening 146 to drivingly engage the flats of a nut head 132 integrally formed in the upper end portion 36 of the trunnion member.

The geneva 144 is formed with a plurality of radially disposed slots 148 and has a scalloped periphery defining a plurality of dwell notches 150, the number of slots and notches each being equal to the number of inlet ports 18. An input rotor, designated by the numeral 154, is mounted on the bottom wall 136 of the housing 134 adjacent to the geneva wheel 144. As is seen in FIG. 3, rotor 154 comprises a ring 156 coaxially surmounted by a cam 158 affixed to the top of the ring. Cam 158 is formed with a hole 160 to matingly receive an upper end portion 162 of an input shaft 166, above an annular flange 164. Cam 158 and upper end portion 162 of input shaft 166 are formed with appropriate keyways for the reception of a spline 168 to drivably couple them together. The parts are held together by means of a set screw 170 receivable in a tapped bore 172 extending radially through the cam 158 in alignment with the corresponding keyhole slot. Input shaft 166 is journaled in a bearing 174 secured to the bottom wall 136 of housing 134. As is shown in FIG. 1, cam 158 is thus in coplanar relationship to geneva wheel 144 while ring 156 of the input rotor 154 is co-rotatable beneath the plane of the geneva wheel.

The cam 158 comprises a sector having a radius like that of the notches 150 of the geneva wheel 144 within which the cam is rotatable. In the illustrated case of an eight position valve, cam 158 includes a sector of approximately 110 degrees between its radial end faces 158A and 158B and has an arcuate edge 158C of about 250 degrees. Adjacent to the periphery of the ring 156 of the input rotor 154, a geneva drive roller 176 is mounted on the top surface of the ring 156, centered on a radius of the ring that bisects the angle included between cam end faces 158A and 158B.

A sprocket wheel 180 is formed with a hollow hub 182 to be mounted on the seal piston actuating shaft 114 coaxially with the geneva wheel 144. An upper end portion of the hub 182 is constrained into alignment by a cup 178 affixed to the underside of a cover 188 of housing 134 and is formed with a diametral slot 184 positioned in alignment with the slot 128 at the upper end of actuating shaft 114. Sprocket 180 and shaft 114 are thus keyed together for co-rotation when the key 130 is disposed in the slots. Sprocket 180 is formed with a plurality of equally circularly spaced apart radially disposed asymmetrical slots 186, equal in number to the number of inlet ports 18. Each slot 186 is centered on a radius of the sprocket 180 but has a clockwise edge 186A (as viewed in FIG. 4) which is longer than the opposite or counter-clockwise side 186B.

A reciprocatable actuator yoke for the sprocket 180, designated by the numeral 190, comprises an identical pair of lever arms 192 rigidly held together in parallel superposed relationship by a spaced apart pair of bridging plates 194 and 206 affixed to edges of the arms 192. An oscillatable bar 196, which is relatively short as compared to the arms 192, is disposed between the arms 192 to be slidably embraced thereby. The root ends of the members 192 and 196 are formed with coaxial holes for the reception of a sleeve bearing 198 mounted on a hollow stud portion of a post member 200 that is secured on top of the bottom wall 136 of the housing 134. The hollow stud is interiorly threaded to receive a threaded shank of a fastener 202, which passes through a washer 204 on the top surface of upper arm 192, for pivotally mounting the yoke 190 and bar 196 to the post 200. As is shown in FIG. 1, post 200 is so located that the members 192 and 196 supported thereby overhang input rotor 154.

Each of the arms 192 is relieved along one edge 210 and has an enlarged distal end lobe 212. The lobe ends 212 of the upper and lower arms 192 are formed with a coaxial hole 214 and a threaded hole 216, respectively, to receive a fastener 218 having a smooth shank portion and a threaded end 222 receivable in the tapped bore 216. A roller 224 is mounted on the smooth shank of the fastener 218 for coaction with the asymmetrical slots 186 of the sprocket 180. As is shown in FIG. 1, the distal end lobes 212 of the arms 192 confront the opposite sides of the sprocket 180, while the roller 224 is preferably of an axial length such that its opposite ends rotatably bear against the confronting surfaces of the arms 192.

The bar 196 is formed with an elongate longitudinally extending slot 230 which, in plan view, is unobstructed by the arms 192 due to the relieved edges 210 of the arms. The slot 230 of the bar 196 slidably receives a crank pin roller 232 mounted on the upper face of the cam 158 of the input rotor 154. The roller 232 is located adjacent the end face 158A of cam 158 and, upon rotation of the input rotor, engages one or the other of the opposite side walls of the slot 230 to effect limited reciprocation of the bar 196 relative to the arms 192. One longitudinal edge of the bar 196 is formed with a tapped bore 236 that receives the threaded end 238 of a smooth-shanked headed fastener 240. The smooth shank of fastener 240 extends with clearance through a hole 242 formed in bridge plate 194 and, on the outside of the plate 194, coaxially supports biasing means in the form of a coil spring 244 which is held under compression between the plate 194 and the head of fastener 240.

The bridge plate 206 is affixed to the yoke arms 192 at a location adjacent the swingable free end of the bar 196. The bridge plate 206 is centrally formed with a threaded hole 250 that receives the threaded shank of a headed stop screw 254 which also mounts a lock nut 252 located between the screw head and the outside of bridge plate 206. The screw 252 is thus axially adjustable relative to the bridge plate 206 to vary the gap between the inner end of the stop screw 252 and a confronting edge of the bar 196 when the parts are in the condition of FIG. 4, after which the lock nut 254 is threaded against the outer face of bridge plate 206 to maintain the desired gap.

Referring to FIG. 3, the upper face of the hub 142 of geneva wheel 144 is formed with a pair of diametrically opposite upwardly open pockets 260 to receive a pair of coil springs 262 beneath a pair of detent balls 264. When the geneva wheel and sprocket 180 are in the relative positions indicated in FIG. 4, detent balls 264 are entirely contained within pockets 260 by unbroken portions of the underside of the lower end of the hub portion 182 of the sprocket 180. When the sprocket 180 is moved in a retrograde or counter-clockwise direction from the position of FIG. 4 relative to the geneva wheel 144 through a predetermined arc, the pair of detent balls 264 come into registration with a diametrically opposite pair of detent pockets 266 formed in the underside of the sprocket hub 182. Thereafter, during a phase of the operation when the sprocket drive roller 224 is disengaged from the sprocket 180 but geneva drive roller 176 is engaged with a slot 148 of the geneva wheel, the detent means effects co-rotation in a forward or clockwise direction of the sprocket 180 along with of the geneva wheel 144.

A source of torque, such s an electric motor M, coupled to an appropriate reduction gear box, may be secured to one side of the housing 134 and has an output shaft 270 drivingly coupled to the drive shaft 166, as by means of an endless drive chain 272.

Figure 4:
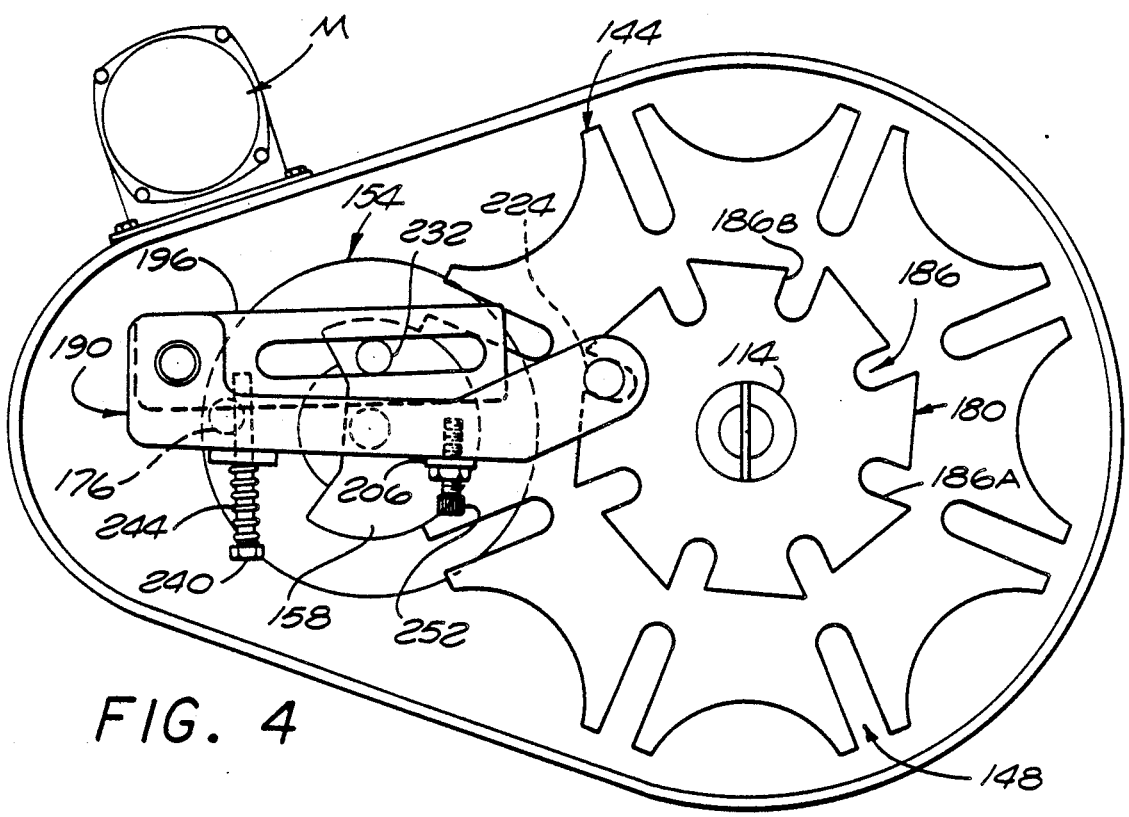
FIGS. 4 and 5 are top plan views of the valve control mechanisms in two different relative positions of certain of their parts.

The operation of the invention is as follows:

When the valve is in the test position of FIG. 1, the mechanism 12 has its parts in the relative positions indicated in FIG. 4. More specifically, the cam 158 is centered in a dwell notch 150 of geneva 144. The seal piston 72 then is coaxially aligned with one of the inlet ports 18 and holds the 0-ring seal 100 against the cylindrical surface 66 within the valve body 14. At the same time, the yoke 190 is held in the position of FIG. 4 by the engagement of the yoke roller 224 with one of the asymmetrical grooves 186 of the sprocket 180. Simultaneously, the spring 244 exerts its maximum force against the bar 196, which force is transmitted by roller 224 and sprocket 180 to maximize compression of the seal ring 100. Also, the inner end of stop screw 252 is spaced apart from the confronting side edge of the bar 196 and the detent balls 264 are disengaged from the sprocket 180.

Figure 5:
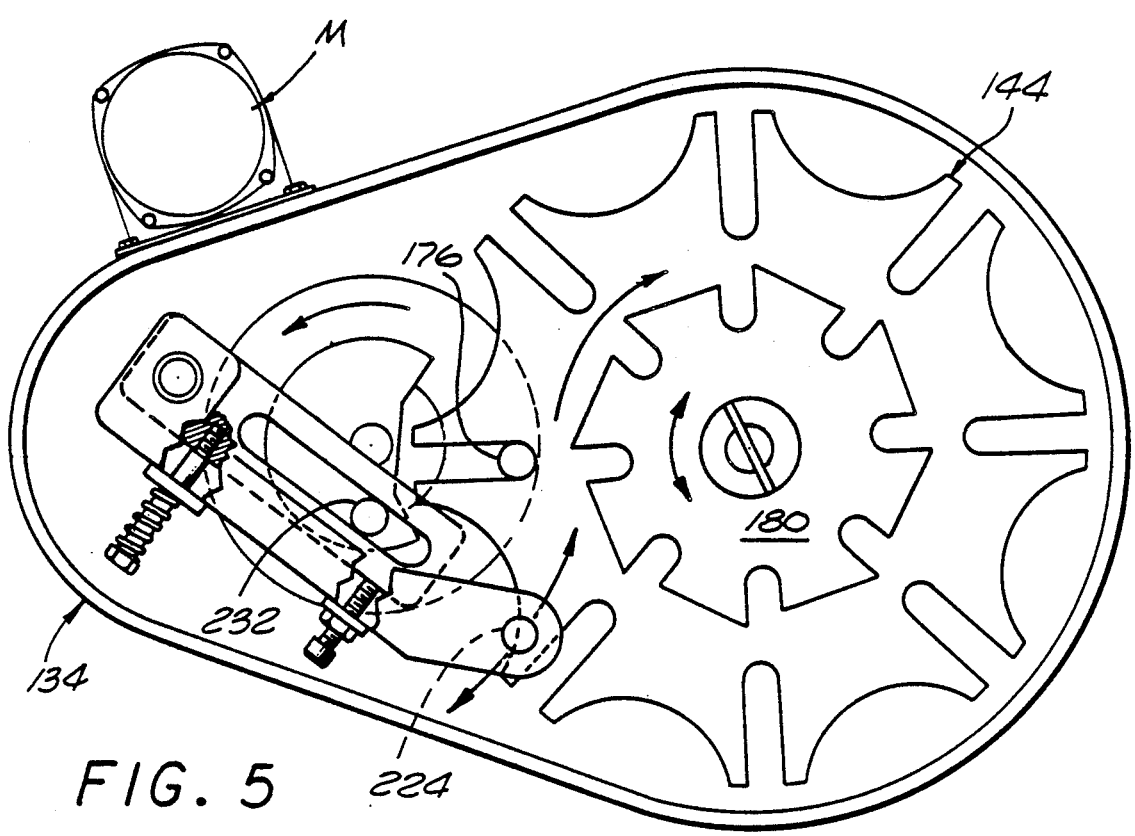

When it is desired to rotate trunnion member 38 and seal piston 72 forwardly to an adjacent inlet port 18, the seal piston 72 is first retracted, prior to any rotation of the trunnion member, in the following manner:

The motor M is energized to impart torque to the input rotor 154 to turn it in a counter-clockwise direction as viewed in FIG. 4. As cam 158 rotates within the engaged dwell notch 150 the roller 232 carried by the cam swings the bar 196 in the retrograde direction until an edge thereof engages the inner end of the stop screw 254. Thereafter, continued rotation of the cam 158 simultaneously moves the bar 196 and yoke arms 192 in a retrograde direction towards the positions of FIG. 5. Continued rotation of the input rotor rotates cam 158 fully out of contact with the dwell notch 150.

When the cam carried roller 232 has moved counter-clockwise approximately 78 degrees from its position of FIG. 4, the sprocket 180 has been retro-rotated counter-clockwise approximately 52 degrees from its position of FIG. 4 by the sprocket drive roller 224 and the detent balls 264 then engage the detent pockets 266 of the sprocket wheel. Simultaneously, due to the abbreviated length of the side 186B of the asymmetrical slots 186 of the sprocket, sprocket roller 224 escapes from the sprocket wheel slot. At this point, actuating shaft 114 has been counter-clockwise rotated to retract seal piston 72 into the nozzle 52, as shown in FIG. 2. As the seal ring 100 has been retracted out of contact with the cylindrical surface 66 of the valve body, the trunnion assembly is now ready for rotation forwardly to the next adjacent inlet port 18.

As the input rotor continues to turn, the geneva drive roller 176 carried thereby enters the next slot 148 of the geneva wheel to rotate the trunnion assembly forwardly, with the retracted seal piston 72 (FIG. 7), towards the next inlet port 18 along with the sprocket 180 co-driven through the detent balls 264. Further rotation of the input rotor 154 disengages geneva drive roller 176 from the geneva wheel slot as cam 158 rotates into the next dwell notch 150 to arrest further rotation of the geneva wheel. The trunnion nozzle is thus precisely aligned with the next inlet port 18. Further rotation of the input rotor also returns the sprocket drive roller 224 of the yoke 190 into driving engagement with side 186A of the next asymmetrical slot 186 as the yoke, and the bar 196 driven thereby, move forwardly from the FIG. 5 position towards the FIG. 4 position. When the yoke 190 reaches the FIG. 4 position the seal piston 72 extends into the FIG. 1 condition while further rotation of the input rotor, to bring the bearing 232 into the position shown in FIG. 4, swings the bar 196 away from the yoke 190 to compress spring 244. The high spring load on the yoke is transmitted through its bearing 224 against the sprocket to crush the seal ring 100 into tight sealing engagement with the cylindrical surface 66 of the valve body. At this point, an electrical signal is sent to the motor M to stop further rotation of the input rotor. The valve is now in a new test position to induct a fluid through inlet port 18 through elbow passage 62 and out of the test port 66.

We claim:

1. A selector valve comprising;
   a valve body formed with a plurality of spaced apart inlet ports and first and second outlet ports;
   a selector means formed with a fluid passage therethrough between inlet nozzle and outlet portions of said passage of said selector means,
   said selector means being movably mounted within said valve body with said outlet portion in communication with said first outlet port while said inlet nozzle portion is sequentially movable into registration with said inlet ports;
   a hollow seal support means coaxially reciprocably mounted at an outer end of said nozzle portion of said selector means for movement between extended and retracted positions;
   an endless seal means mounted on an outer end face of said support means;
   an actuating means comprising an actuating shaft mounted in contact with said seal support means for reciprocating said support means between extended and retracted positions to move said seal means into and out of sealing contact with said valve body around a selected one of said inlet ports in registration with said nozzle portion of said selector means;
   a control means operatively connected to said selector means for moving said selector means into and out of registration with a selected one of said inlet ports; and
   sequencing means operatively connected between said actuating means and said control means for effecting sequential retraction of said support means, movement of said selector means and retracted seal support means from one to another of said inlet ports, and extension of said support means.

2. A selector valve as in claim 1 in which:
   said selector means comprises a trunnion member that is rotatably mounted in said valve body and has a side arm comprising said nozzle portion;
   said inlet ports being circularly spaced apart and having axes in a common plane that includes the axis of said nozzle portion,
   each of said inlet ports being surrounded by a seat that is sealingly engageable by said seal means when said seal support means is in an extended position;
   said outer end face of said seal support means and said seats of said inlet ports have matingly complementary shape characteristics,
   whereby said outer end face and each of said seats have faying contact when said seal support means is in an extended position.

3. A selector valve as in claim 2 in which:

said outer end face of said seal support means is formed with an endless groove and said endless seal means is mounted within said groove;

said seal means comprises a resiliently compressible material; and said groove and said seal means have cross sections so proportioned that, when said seal support means is in a retracted position such that said outer end face is spaced from the seat around one of said inlet ports, said seal means protrudes outwardly beyond said outer end face, whereby, when said outer end face and the seat around one of said inlet ports are in faying contact while said seal support means is in an extended position, said endless seal means is resiliently deformed on said seat.

4. A selector valve as in claim 1 wherein:

said seal support means is retractable to a position in which said seal means is fully removed from contact with said valve body, whereby said selector means can be moved between said inlet ports without contact of said seal means and said body when said seal support means is in retracted position.

5. A selector valve as in claim 1 in which:

said actuating shaft has an external end projecting from said valve body, and said actuating means comprises a wheel drivingly coupled to said projecting end of said actuating shaft.

6. A selector valve as in claim 1 in which:

said selector means has an external end projecting from said valve body, and said control means for moving said selector means comprises a wheel drivingly coupled to said projecting end of said selector means.

7. A selector valve as in claim 1 in which:

said actuating shaft and said control means each has an external end projecting from said valve body; and said actuating shaft is coaxially mounted within said selector means within said projecting ends;

said actuating means comprises a first wheel drivingly connected to said projecting end of said actuating shaft; and said control means for moving said selector means comprises a second wheel drivingly coupled to said projecting end of said selector means.

8. A selector valve as in claim 7 further comprising:

a rotary drive shaft drivingly coupled to said first and second wheels on an axis that is parallel to the axis of said first and second wheels, each of said wheels being formed with a plurality of radially extending slots equal in number to the number of said outlet ports.

9. A selector valve as in claim 9 in which:

an input rotor is coaxially mounted on said shaft, said rotor having a peripherally located drive roller for sequentially drivably engaging said slots of said second wheel.

10. A selector valve as in claim 9 further comprising:

a cam coaxially fixed to said input rotor;

said second wheel having a scalloped edge defining a plurality of arcuate dwell notches alternately spaced with said radially extending slots of said second wheel, said cam being disposed oppositely to said cam on said input rotor, said cam having a peripheral arcuate edge of a radius matingly complementary to the radii of said dwell notches, said arcuate peripheral edge of said cam having an arcuate length such that upon rotation of said input shaft said arcuate edge maintains said second wheel stationary by slidable engagement with said dwell notches alternately with driving engagement of said drive roller with said radial slots of said second wheel.

11. A selector valve as in claim 10 further comprising:

a lever having a pivotally mounted root end portion on an axis that is parallel to the axis of said first and second wheels; and means comprising a distal end portion of said lever and said slots of said first wheel for converting rotation of said input shaft into retrograde movement of said first wheel and actuating shaft to retract said seal support means while said peripheral edge of said cam maintains said second wheel stationary.

12. A selector valve as in claim 8 further comprising:

a lever having a pivotally mounted root end portion on an axis that is parallel to the axis to said first wheel; and means comprising a distal end portion of said lever and said slots of said first wheel for converting rotation of said drive shaft into retrograde movement of said first wheel and actuating shaft to retract said seal support means.

13. A selector valve as in claim 12 in which:

said means for converting rotation of said drive shaft into retrograde movement of said first wheel and actuating shaft comprises an input rotor coaxially mounted on said shaft, and a bar having a root end pivotally mounted on said axis of said lever;

said bar and said rotor having coacting means to translate rotation of said shaft into oscillatory movement of said bar;

and a stop means is between said bar and said lever for converting a portion of the oscillatory movement of said bar into retrograde movement of said lever and said first wheel.

14. A selector valve as in claim 13 in further comprising:

a detent means operatively disposed between said first and second wheels for locking said first and second wheels together for forward co rotation upon the occurrence of a degree of retrograde movement of said lever and said first wheel.

15. A selector valve as in claim 13 in which:

said coacting means to translate rotation of said shaft into oscillatory movement of said bar translate a portion of said oscillator movement of said bar into forward movement of said bar independently of forward movement of said lever during a period of rotation of said shaft when said stop means is disengaged;

and a biasing means is interposed between said lever and said bar for biasing said lever in a direction for forward movement of said first wheel;

said distal end portion of said lever and said slots of said first wheel also comprising a means for converting forward movement of said lever into forward movement of said first wheel, whereby said biasing means exerts a force on said first wheel in a forward direction independently of rotation of said shaft.

16. A trunnion assembly for a multi-port rotary selector valve comprising:
   a trunnion member having a nozzle portion and an elbow passage formed through said member between said nozzle portion and an outlet passage through an end portion of said member;
   a hollow seal support means coaxially reciprocably mounted at an outer end of said nozzle portion for movement between extended and retracted position,
   said seal support means comprising a tubular body coaxially telescopically slidably mounted within said nozzle portion and a seal support ring coaxially mounted on an outer end of said body;
   an endless seal means mounted in an outer end face of said support ring; and
   an actuating means operatively connected to said seal support means for reciprocating said seal support means between extended and retracted positions.

17. A trunnion assembly as in claim 16 further comprising:
   a means operatively connected between said body and said ring for holding said ring against rotation relative to said body.

18. A trunnion assembly as in claim 16 in which:
   said tubular body is formed with an inner end longitudinal extension that is reciprocably matingly engaged within a pocket formed in said trunnion member,
   said extension comprising an eccentric portion of said body,
   whereby said body is keyed against rotation relative to said nozzle portion.

19. A trunnion assembly as in claim 16 in which:
   said seal support ring has an outer end face formed with an endless groove within which said endless seal means is mounted,
   said seal means comprising s resiliently compressable material.

20. A trunnion assembly as in claim 19 in which:
   said endless seal means comprises an O-ring in said groove and in which said O-ring and said groove have cross-sections so proportioned that said O-ring protrudes outwardly beyond said outer end face of said seal ring.

21. A trunnion assembly as in claim 16 in which:
   said actuating means for reciprocating said seal support means comprises an actuating shaft rotatably mounted within said trunnion member in contact with said tubular body,
   said shaft and said body having mutually contacting surfaces to translate rotation of said shaft into axial movement of said body.

22. A trunnion assembly as in claim 21 in which:
   said contacting surfaces of said shaft and said body comprise a pin portion of said shaft and a groove across said body,
   said contacting surfaces of said shaft and said body comprise a pin portion of said shaft and a groove across said body,
   said pin and said groove having planar surfaces in mutual contact and oriented to inhibit rotation of said body within said nozzle portion.

23. A rotary selector valve comprising:
   a valve body formed with a plurality of circularly spaced apart inlet ports and first and second outlet ports;
   a trunnion member formed with a fluid passage therethrough between inlet nozzle and outlet portions of said trunnion member,
   said trunnion member being rotatably mounted within said body with said outlet portion in communication with said first outlet port while said nozzle portion is moveable into successive registration with said inlet ports as said trunnion member is rotated;
   a hollow seal support means coaxially reciprocably mounted at an outer end of said nozzle portion for movement between extended and retracted positions,
   said seal support means comprising a tubular body coaxially telescopically slidably mounted within said nozzle portion and a seal support ring coaxially mounted on an outer end of said tubular body;
   an endless seal means mounted at an outer end face of said support ring; and
   an actuating means operatively connected to said seal support means for reciprocating said support means between said extended and retracted positions to move said seal means into and out of sealing contact with said valve body around a selected one of said inlet ports in registration with said nozzle portion of said trunnion member.

24. A rotary selector valve as in claim 23 further comprising:
   a means operatively connected between said body and said ring for holding said ring against rotation relative to said tubular body.

25. A rotary selector valve as in claim 23 in which:
   said tubular body is formed with an inner end longitudinal extension that is reciprocably matingly engaged within a pocket formed in said trunnion member,
   said extension comprising an eccentric portion of said tubular body,
   whereby said tubular body is keyed against rotation relative to said nozzle portion.

26. A rotary selector valve as in claim 23 in which:
   said seal support ring has an outer end face formed with an endless groove within which said endless seal means is mounted,
   said seal means comprising a resiliently compressable material.

27. A rotary selector valve as in claim 26 in which:
   said endless seal means comprises an 0-ring in said groove and in which said 0-ring and said groove have cross sections so proportioned that said 0-ring protrudes outwardly beyond said outer face of said seal ring when said tubular body is in said retracted position.

28. A rotary selector valve as in claim 23 in which:
   said actuating means for reciprocating said seal support means comprises an actuating shaft rotatably mounted within said trunnion member in contact with said tubular body,
   said shaft and said tubular body having mutually contacting surfaces to translate rotation of said shaft into axial movement of said tubular body.

29. A rotary selector valve as in claim 28 in which:
   said contacting surfaces of said shaft and said tubular body comprise an eccentric pin portion of said shaft and a groove across said tubular body.

30. A rotary selector valve as in claim 29 in which:
said actuating shaft and said trunnion member each has an external end projecting from said valve body; and
said actuating shaft is coaxially mounted within said projecting end of said trunnion member.

31. A rotary selector valve as in claim 23 in which:
opposite ends of said hollow seal support means have different radial areas exposed to fluid pressure present within said fluid passage when said support means is in said extended position to generate a piston effect in a direction to urge said seal support means into said extended position.

* * * * *

UNITED STATES PATENT OFFICE
CERTIFICATE OF CORRECTION

PATENT NO. : 4,989,641
DATED : February 5, 1991
INVENTOR(S) : Jeffrey A. Jones & John W. Herndon It is certified that error appears in the above-identified patent and that said Letters Patent is hereby corrected as shown below:

Title page, item [57], in the ABSTRACT, line 21, "a" should read --at--.

In col. 1, line 58, "sue" should read --use--.

In col. 2, line 38, "cutlet" should read --outlet--.

In col. 8, line 67, "s" should read --as--.

In col. 13, lines 62 - 64 should be deleted.

Signed and Sealed this

Ninth Day of June, 1992

Attest:

DOUGLAS B. COMER

*Attesting Officer*   Acting Commissioner of Patents and Trademarks

UNITED STATES PATENT AND TRADEMARK OFFICE
CERTIFICATE OF CORRECTION

PATENT NO. : 4,989,641

DATED : 2/5/91

INVENTOR(S) : Jeffrey A. Jones et al

It is certified that error appears in the above-identified patent and that said Letters Patent is hereby corrected as shown below:

In column 13, line 42, "s" should read --a--.

Signed and Sealed this

Eighth Day of September, 1992

Attest:

DOUGLAS B. COMER

*Attesting Officer*   Acting Commissioner of Patents and Trademarks